No. 804,068. PATENTED NOV. 7, 1905.
A. STRAKA.
HORSE RELEASER.
APPLICATION FILED JUNE 22, 1905.
2 SHEETS—SHEET 1.
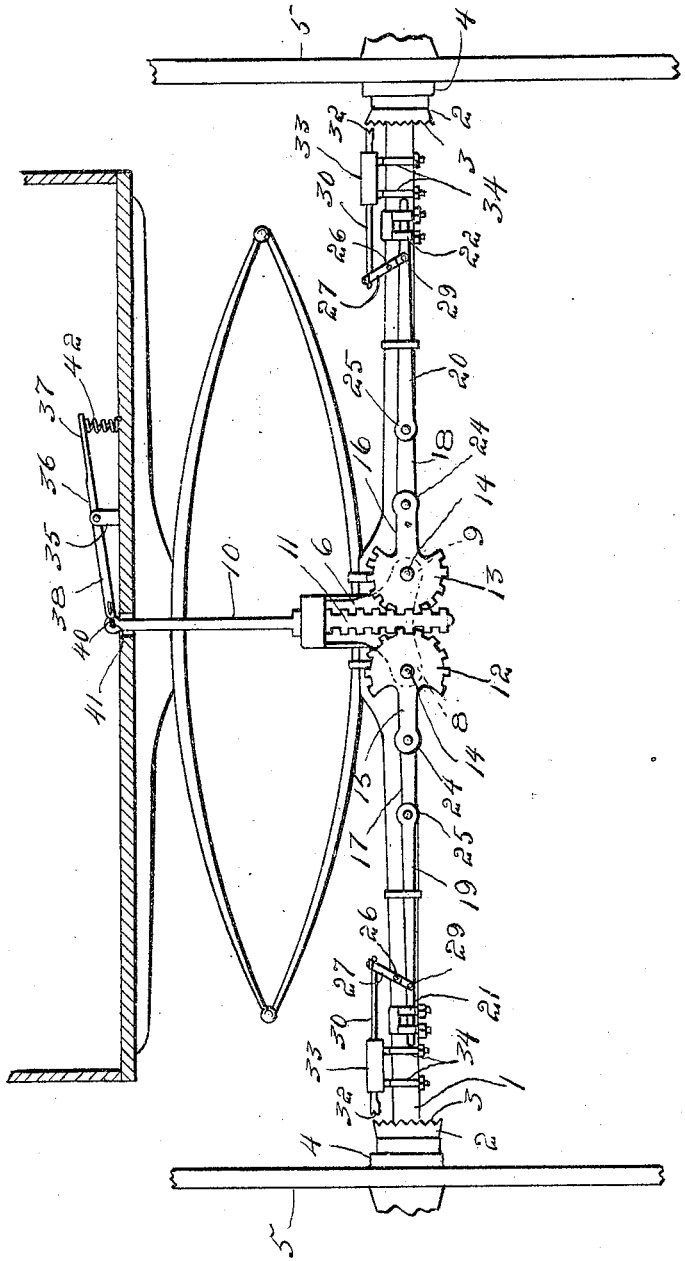

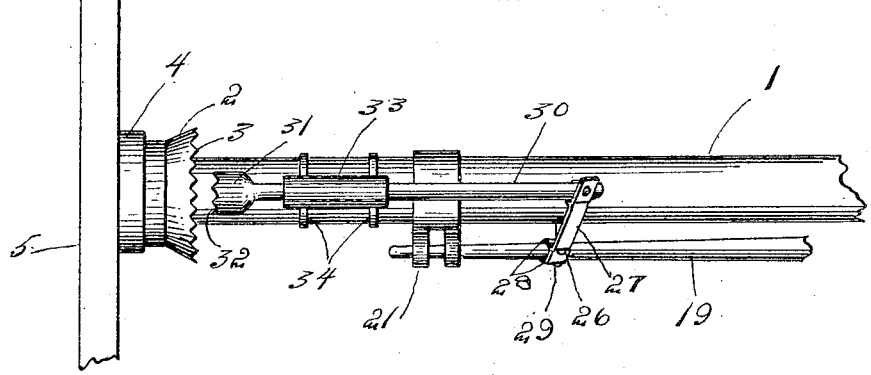
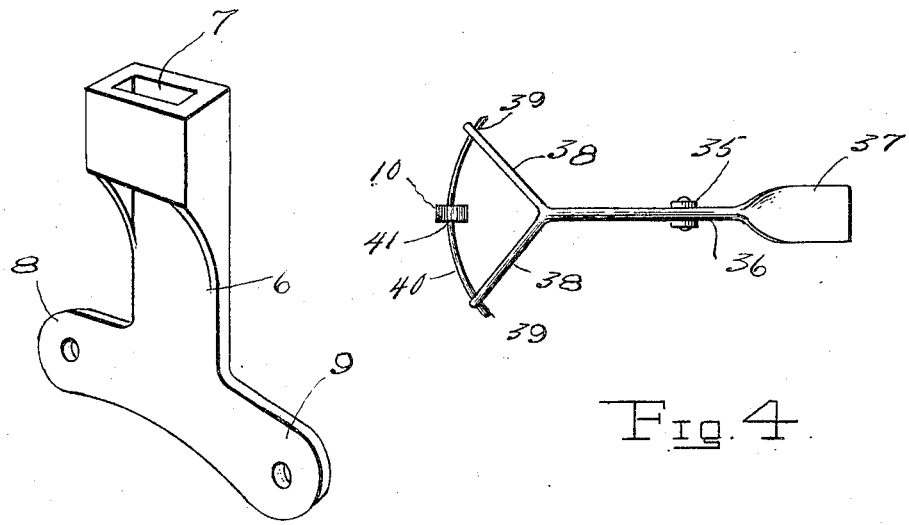

UNITED STATES PATENT OFFICE.

ANTON STRAKA, OF CHICAGO, ILLINOIS.

HORSE-RELEASER.

No. 804,068.　　Specification of Letters Patent.　　Patented Nov. 7, 1905.

Application filed June 22, 1905. Serial No. 266,499.

*To all whom it may concern:*

Be it known that I, ANTON STRAKA, a citizen of the United States, residing at Chicago, in the county of Cook, State of Illinois, have invented certain new and useful Improvements in Horse-Releasers; and I do hereby declare the following to be a full, clear, and exact description of the invention, such as will enable others skilled in the art to which it appertains to make and use the same.

This invention relates to a combined horse releaser and brake.

One object of the invention is to provide a device of the character stated embodying such characteristics that unmanageable or runaway horses may be readily released and the braking mechanism applied simultaneously with the release of the horses.

Another object of the invention is to provide an exceedingly simple, inexpensive, durable, and efficent means for positively releasing one or more animals from a vehicle in the event that the animals become unmanageable.

With these and other objects in view the present invention consists in the combination and arrangement of parts, as will be hereinafter more particularly described, shown in the accompanying drawings, and particularly pointed out in the appended claims, it being understood that changes in the form, proportion, size, and minor details may be made within the scope of the appended claims without departing from the spirit or sacrificing any of the advantages of the present invention.

In the drawings, Figure 1 is a front elevation of a vehicle, illustrating my invention applied thereto, the dash of the vehicle being broken away to illustrate the operating means. Fig. 2 is a top plan view of a portion of the invention. Fig. 3 is a detail view of the guide. Fig. 4 is a top plan view of the lever.

Referring now more particularly to the accompanying drawings, the reference character 1 designates the front axle of a vehicle, there being a flange 2, having a serrated edge 3, fixedly secured upon the inner side of the hub 4 of the front wheel 5 for a purpose presently explained.

Secured upon the forward face of the axle 1 and intermediate the ends thereof is a plate 6, having a perforated flange 7 at its upper end, with its lower end provided with oppositely-disposed ears 8 and 9. Arranged for sliding movement through the perforation of the flange 7 is a shank 10 of a toothed rack 11, the rear face of the rack bearing upon the forward face of the plate 6 for vertical movement with respect to the latter. Mounted pivotally by means of suitable pivot-pins or the like 14 in the ears 8 and 9 of the plate 6 are oppositely-disposed segmental gears 12 and 13, whose teeth mesh with the teeth of the rack 11. Each segmental gear 12 and 13 is provided with a shank portion 15 and 16, respectively, which are pivoted at their free ends to links 17 and 18, respectively, the free ends of the respective links 17 and 18 being pivotally connected with the rods 19 and 20, whose free ends are designed to pass through the perforated pairs of ears 21 and 22, arranged at each end of the axle 1 for the reception of the shafts 23 of the vehicle, the said rods 19 and 20 being designed to pierce the respective shafts in the usual manner for securing them to the vehicle. It will be observed that the free ends of the shanks 15 and the inner ends of the rods 19 are each provided with oppositely-disposed ears 24 and 25, respectively, for the reception therebetween of the links 17 and 18.

Pivotally mounted at each end of the axle 1, as at 26, is a rocking lever 27, whose lower end is bifurcated to form ears 28, designed to embrace the respective locking-rods 19 and 20, there being a suitable pin 29 for securing the said ears to the said rods. The upper end of each rocking lever 27 is pivotally connected with the respective brake-rods 30, which latter each has its outer end broadened, as at 31, and provided with teeth 32 for engagement with the teeth of the corresponding flange 2, arranged upon the inner ends of the hubs of the forward wheels. The brake-rods 30 are guided in their movement toward and away from the teeth of the collars 2 by means of the cylindrical-shaped guide member 33, which is supported above the axle 1 by means of the oppositely-disposed pairs of legs 34, each pair of legs being connected together beneath the axle to prevent displacement of the guide, as clearly shown in the drawings.

Mounted upon the floor of the vehicle in advance of the front seat thereof is a fulcrum-block 35, upon which is pivotally mounted a foot-lever 36, one end of the lever being broadened, as at 37, for the reception of a foot of the operator or occupant of the vehicle when necessary, the opposite end of the said foot-lever having diverging arms 38, each arm having a perforation 39, there being a suitable connection 40 passed through the said perforations of the arms and the perforation 41 at the upper end of the shank 10 of the rack 11. It will be understood that the connection 40 may be used to lift the rack 11 by hand instead of using the foot-lever 37. The object of the invention is to dispose the rack 11 normally in its downward position, there being a flat or other spring 42 arranged beneath the foot-lever 36 for the purpose of holding the latter normally in raised position.

Reference to Fig. 1 of the drawings will disclose the invention as applied to a vehicle in operative position. Now in the event that the animal or animals should become unmanageable they could be released by an occupant of the vehicle upon pressure of the foot of the latter upon the foot-plate 36. In other words, pressure upon the foot-plate 36 would lift the rack 11, and the rack being in mesh with the segmental gears 12 and 13 would cause the latter to rock and the said gears being connected to the locking-rods 19 and 20 by the link connections 17 and 19, their rocking movement would pull the rods 19 and 20 outwardly of the clips or the like 21 and 22 and release the shafts of the vehicle. The inward movement of the locking-rods 19 and 20 caused in the manner just explained and the said locking-rods being guided in their horizontal movement by the guides 33 upon the axle 1 would cause the rocking levers 27 to move toward the inner ends of the hubs of the forward wheels, and consequently throw the brake-rods 30 into engagement with the flanges 2 of the corresponding hubs, thereby locking the vehicle against movement simultaneously with the release of the animal or animals from the vehicle.

From the foregoing it will be seen that my invention is of an exceedingly simple nature and that a single movement on the part of an occupant of the vehicle will release the animals and simultaneously apply the brake to the vehicle. In other words, the vehicle can be braked or stopped simultaneously with a release of the animals therefrom, thereby preventing injury to occupants of the vehicle in the event of runaway or unmanageable animals.

What is claimed is—

1. A device of the character described comprising a plate, a rack slidably arranged centrally of the plate, a segmental gear connected to the plate upon each side of the rack for mesh therewith, each segmental gear having a shank, a locking-rod arranged upon one side of each segmental gear, a link connection between each locking-rod and the respective shank of each gear, a rocking lever connected with each locking-rod, a brake-rod pivotally connected to each rocking lever, and means connected to the aforesaid rack, whereby the locking-rods may be moved in a direction opposite to the direction of movement of the brake-rods.

2. The combination with a vehicle including a front axle, wheels and shafts, the front wheels each having a toothed collar thereupon, of a plate secured upon the said axle, a rack slidably mounted centrally of the said plate, a gear mounted upon the plate at each side of the said rack for mesh therewith, each gear having a shank, a locking-bar arranged at each end of the axle for locking the shafts thereto, a link connection between each locking-rod and each of the aforesaid shanks, a rocking lever pivotally mounted at each end of the axle and connected with each locking-rod, a guide arranged upon the axle adjacent to each rocking lever, a brake-rod pivotally connected to each rocking lever, and provided with teeth at its outer end for engagement with the corresponding tooth-collars of the front wheels of the vehicle, the said brake-rods being held in proper position by means of the aforesaid guides, and a foot-lever connected with the aforesaid rack whereby the shafts of the vehicle may be released from the axle and the brake-rods simultaneously applied to the aforesaid collars.

In testimony whereof I affix my signature in presence of two witnesses.

ANTON STRAKA.

Witnesses:
  FRANK HOUSIK,
  MARY STRAKA.